United States Patent [19]

Van Den Berg et al.

[11] 3,880,817
[45] Apr. 29, 1975

[54] PROCESS OF PREPARING A SULPHUR-CURABLE POLYMER OF ETHYLENE AND AT LEAST ONE OTHER ALPHA-ALKENE

[75] Inventors: Cornelis E. P. V. Van Den Berg, Geleen; Leonard J. G. Tummers, Born, both of Netherlands

[73] Assignee: Stamicarbon N.V., Heerlen, Netherlands

[22] Filed: Sept. 28, 1972

[21] Appl. No.: 293,668

Related U.S. Application Data

[63] Continuation of Ser. No. 5,096, Jan. 22, 1970, abandoned, which is a continuation of Ser. No. 21,503, May 15, 1969, abandoned.

[52] U.S. Cl.......... 260/80.7; 260/79.5 B; 260/80.78
[51] Int. Cl. .............................................. C08f 15/04
[58] Field of Search ............ 260/80.78, 79.5 B, 80.7

[56] References Cited
UNITED STATES PATENTS 3,367,922  2/1968  Somenfeld et al. .............. 260/80.78
3,624,056  11/1971  Minchok ........................ 260/94.9 E

OTHER PUBLICATIONS

Minchak Patent U.S. equivalent of French Patent of record in Parent Applications.

*Primary Examiner*—Harry Wong, Jr.
*Attorney, Agent, or Firm*—Cushman, Darby & Cushman

[57] ABSTRACT

The present invention relates to the preparation of sulphur-curable polymers of ethylene, at least one other α-alkene and at least one poly-unsaturated compound, using a catalyst prepared from an aluminium-halogen compound, e.g. an aluminium trihalide or an hydrocarbylaluminium halide, a transition metal compound, an alkyl or cyclo-alkyl magnesium compound and optionally an activator.

10 Claims, No Drawings

PROCESS OF PREPARING A SULPHUR-CURABLE POLYMER OF ETHYLENE AND AT LEAST ONE OTHER ALPHA-ALKENE

CROSS REFERENCE TO RELATED APPLICATION

This application is a continuation of Ser. No. 5,096, filed Jan. 22, 1970, which was a continuation of Ser. No. 21,503, filed May 15, 1969, both abandoned.

The present invention relates to a process of preparing a sulphurcurable polymer of ethylene, at least one other $\alpha$-alkene and at least one poly-unsaturated compound, in which process a mixture of these monomers is contacted in a liquid distributing agent with a catalyst prepared from an aluminum-halogen compound, a compound of a transition metal, and an organo-magnesium compound; it relates more in particular to the preparation of a catalyst for use in this process.

The said process is known from the Netherlands Patent application No. 6613606, according to which the organo-magnesium compound used is a diaryl magnesium, preferably diphenyl magnesium. A drawback attaching to this process is that the polymerization medium must be free of oxygen, water and other polar compounds. Furthermore, it is a disadvantage that the diaryl magnesium compounds easily give rise to colored polymerization products.

It has been found that an alkyl or cycloalkyl magnesium derivative can be used as the magnesium compound. The resulting catalyst is highly active and well soluble in the polymerization medium applied, for the magnesium compounds in question can be obtained as colourless clear solutions. An advantage of the magnesium compounds applicable in the process of the invention is that relatively larger amounts of a polar compound, e.g. diethyl ether, can be allowed to be present in the polymerization medium. With the aid of the catalyst according to the invention it is easy to prepare homogeneous polymers of ethylene, at least one other $\alpha$-alkene and at least one poly-unsaturated compound, which are free of gel and which can be sulphur-cured in a simple way to form vulcanized products with excellent properties. It is an additional advantage of the present catalyst system that the initial activity is greater compared to those cases in a diaryl magnesium is used as the magnesium component. This is advantageous in effecting a continuous process with short residence times. Other advantages of the invention will be mentioned hereafter.

The process of preparing a sulphur-curable polymer of ethylene, at least one other $\alpha$-alkene and at least one poly-unsatured compound, in which process a mixture of these monomers is contacted, in a liquid distributing agent, with a catalyst prepared from an aluminim halogen compound, a compound of a transition metal, and an organo-magnesium compound, is characterized in that the organo-magnesium compound used is an alkyl or cycloalkyl magnesium derivative.

Examples of the magnesium compound used in the process of the invention are dialkyl magnesium with equal or different alkyl groups having 1 to 12 carbon atoms and preferably 2 to 4 carbon atoms, e.g. diethyl magnesium, dipropyl magnesium, dibutyl magnesium, didecyl magnesium and didocecyl magnesium; dicycloalkyl magnesium with equal or different cycloalkyl groups having 3 – 12 carbon atoms, preferably 5 or 6 carbon atoms. The magnesium compound used may also contain both an alkyl and a cycloalkyl group. In the compounds just described one of the hydrocarbon groups may be replaced by an alkoxy group, e.g., an ethoxy, isopropoxy, butoxy or decoxy group, by a halogen atom, e.g., a chlorine, bromine or iodine atom, or by a hydroxyl group. This brings in such compounds as ethyl magnesium chloride, ethyl magnesium bromide, propyl magnesium hydroxide, butyl decoxy magnesium, dodecyl butoxy magnesium, butyl isopropoxy magnesium, isobutyl butoxy magnesium, and cyclohexyl butoxy magnesium. In particular with the latter category of magnesium compounds it is advantageous that polar compounds, such as ethers, e.g. diethyl ether, dibutyl ether or tetrahydrofuran, may be present in excess, so that the magnesium compound may be prepared in a very simple way. It is not necessary to exclude ether in the preparation of the magnesium compound. By preference use is made of diethyl magnesium, dibutyl magnesium, butyl isopropoxy magnesium and butyl decoxy magnesium. It is also permissible to use mixtures of magnesium compounds.

An activator may be applied, if desired. Suitable activators are e.g. an alkanol, an alkenol, an alkanolate, an alkenolate, a carboxylic acid, an ester or a salt thereof, an aldehyde a ketone, ozone, oxygen and/or water.

The aluminium-halogen compound employed may be an aluminium trihalide, e.g. aluminium trichloride or aluminium tribromide, or an organo-aluminium halide. It is also possible to use mixtures of aluminium compounds. Suitable organo-aluminium halides contain on average at least one, and at most two halogen atoms and at least one hydrocarbon radical having one of its carbon atoms directly bound to aluminium. The hydrocarbon radical may be an alkyl, cycloalkyl, alkaryl, aryl or aralkyl group. Examples of the organo-aluminium compounds are diethylaluminium-chloride, monoethylaluminium chloride, diisobutylaluminium chloride, diisobutylaluminium bromide, aluminiumethylsesquichloride and monohexylaluminiumdichloride.

The transistion metal compound used is preferably a compound in particular a chloride - of a metal out of the groups 4 – 6 incl. of Medeleev's periodic system, in particular a compound of trivalent or tetravalent titanium or of vanadium, soluble in the polymerization medium. Examples of suitable compounds are $TiBr_4$, $TiI_4$, $VCl_4$, $VBr_3$, $VOCl_3$ and $VCl_5$, $ZrCl_4$, $MoCl_5$, $MoCl_4$, $MoCl_3$, $WCl_6$ and in particular $TiCl_4$ and/or $TiCl_3$. If so desired one or more halogen atoms may be replaced by an alkoxy group or a chelate radical, so that, for instance, tetrabutoxy titanium and vanadium acetyl acetonate may be used.

The ratio of the aluminium compound to the transition metal compound can be varied within wide limits, e.g. between 2 : 1 and 100 : 1, and is preferably between 5 : 1 and 45 : 1. The catalyst component may be added in an arbritary order. Preferably the transition metal compound is not first reacted with the aluminium-halogen compound. If the process is carried out as a continuous process, the catalyst components are preferably supplied direct to the polymerization zone, dissolved in a distributing agent.

The molar ration of the magnesium compound to the transition metal compound may also vary widely. In general, the activity of the catalyst shows an initial sharp rise as this ration becomes higher, thereafter to pass through a maximum and decrease again. The ratio at which maximum activity is attained is in general lower according as the ratio of aluminium to transition metal is lower. Usually, the magnesium to transition metal ratio is between 0.1 and 200; by preference it is between 0.3 and 50, more in particular between ½ and 10.

The molar ratio of the aluminium compound to the magnesium compound is generally between 0.25 and 50, preferably between 0.5 and 30.

Suitable α-alkenes which, besides ethylene, can be used as monomers are the α-alkenes with at most 9 carbon atoms, e.g. propylene, butene-1, pentene-1, hexene-1, octene-1, the branched isomers thereof, such as 4-methyl pentene-1, styrene, α-methyl styrene, vinyl chloride or acrylic acid, or mixtures of the compounds mentioned above. Propylene and/or butene-1 are particularly suitable.

The poly-unsaturated compound may be any of the usual compounds; it contains at least two C=C bonds and may be aliphatic or alicyclic. In general, the aliphatic poly-unsaturated compounds contain 3 to 20 carbon atoms, with conjugated or non-conjugated double bonds. Examples in point are: 1.3-butadiene, isoprene, 2.3-dimethyl butadiene 1-3, 2-ethyl butadiene 1-3, piperylene, myrcene, allene, 1.2-butadiene, 1.4.9-decatrienes, 1.4-hexadiene, 1.5-hexadiene, and 4-methyl hexadiene 1-4. The alicyclic poly-unsaturated compounds, which may optionally contain a bridge group, may be either monocyclic or polycyclic and may optionally contain one or more halogen atoms. In general, use may be made for instance of alkyl norbornadienes, of alkalidene norbornenes, in particular the 5-alkylidene norbornenes-2, in which the alkylidene group contains 1 – 20, and preferably 1 – 8 carbon atoms, of alkenyl norbornenes, in particular the 5-alkenyl norbornenes-2, in which the alkenyl group contains 3 – 20, by preference 3 – 10 carbon atoms, e.g. 5-(2'-methyl-2'-butenyl)-norbornene-2 and 5-(3'-methyl-2'-butenyl)-norbornene-2; dicyclopentadiene and the polyunsaturated compounds of bicyclo-(2.2.1)-heptane, bicyclo-(2.2.2)-octane, bicyclo-(3.2.1)-octane and bicyclo-(3.2.2)-nonane, with at least one of their rings unsaturated. It is also possible to use such compounds as 4.7.8.9-tetrahydroindene and isopropylidene tetrahydroindene. More in particular, use is made of dicyclopentadiene, 5-methylene-norbornene-2 or 5-ethylidene-norbornene-2, or of hexadiene 1-4. Mixtures of the compounds mentioned above may also be used.

In general, only small amounts of these poly-unsaturated compounds need be incorporated in the amorphous polymer, e.g. 0.5 to 10 percent by weight, in order to achieve a sufficient degree of curing; however, it is also possible to incorporate larger amounts.

In general, the polymerization reaction is carried out at a temperature between −40° and 80°C, preferably at 10°–50°C. The pressure will generally be 1 – 50 atm., but higher or lower pressures may also be applied. By preference operation is continuous, but semi-continuous or batch-wise realization of the process is also possible, if desired in one or more stages.

The distributing agent may be any liquid that is inert with respect to the catalyst, e.g. one or more saturated aliphatic hydrocarbons, such as butane, pentane, hexane, heptane, pentamethyl heptane, or petroleum fractions; aromatic hydrocarbons, e.g. benzene or toluene, or halogenated aliphatic or aromatic hydrocarbons, e.g. ethylene tetrachloride. By preference such a temperature and pressure are used that one or more of the monomers applied, in particular the α-alkene, e.g. propylene, is in the liquid state and is present in such an amount that it can serve as distributing agent. No other distributing agent is needed in that case. The process according to the invention can be carried out in a polymerization reactor filled with gas and liquid, but preferably in a reactor completely filled with liquid.

The molecular weight of the polymers is indicated in terms of the intrinsic viscosity, which is measured on a solution of 100 g of polymer in 100 cub.cm of decalin at 135°C. In general, the molecular weight can be influenced by the use of so-called chain controllers, e.g. acetylene, zinc alkyls and alkyl halogenides, and preferably be means of hydrogen. Very small amounts of hydrogen suffice to influence the molecular weight sufficiently while being moreover soluble in the polymerization medium.

The reaction mixture obtained in the polymerization can, whether or not after deactivation of the catalyst with, e.g., water, alcohol or an acid, be stripped of the polymer by distilation, with or without addition of water, steam or methanol.

The polymer obtained by the process according to the invention usually contains between 20 and 75 percent by weight of ethylene, 24 – 79 percent by weight of one or more other α-alkenes, and at least 0.5 percent by weight of one or more poly-unsaturated compounds. In special applications, the polymer may contain larger amounts e.g.: up to 30 percent by weight, of a poly-unsaturated compound.

To the polymers prepared may be added the usual chemicals, e.g. zinc oxide, stearic acid, sulphur, anti-oxidants, organic accelerators, such as tetramethyl thiuram disulphide, so-called "tackifiers," colouring agents and pigments. If so desired, al least some of these additives may be present already during the polymerization, e.g. one or more anti-oxidants. These can be added as such, but it is preferred to distribute them in the liquid or liquids used as distributing agent(s) in the polymerization and/or in one or more of the liquid or liquefied monomers to be applied. It is also possible to add to the polymer fillers, whether or not of a reinforcing character, e.g. chalk, kaolin and carbon black and so-called extender oils, which addition may, if so desired, be effected during the polymerization.

After curing, the polymers form a product with excellent properties, suitable for use in car tyres. If the polymers according to the invention are mixed with other rubbers showing little unsaturation, e.g. butyl rubber, and/or with highly unsaturated rubbers, e.g. butadiene styrene rubbers, curing yields products with very good mechanical properties. The polymers can also be used in the production of bicycle tyres, conveyor belts, shoes, floor covering and sealing strips.

The polymers obtained by the process of the invention can be cured in a very simple way by heating them in the presence of sulphur at 100°–250°C, preferably at 140°–170°C. If desired, the curing recipes normally used for butyl rubber may be applied. It is also possible, but not necessary, to add sources of free radicals, such as peroxides.

If so desired, the polymers obtained by the process according to the invention may be given the shape of crumbs, of sheets, strands or bales.

The following examples are meant to further elucidate the invention without restricting it.

EXAMPLE 1

Into a double walled metal reactor, provided with a stirrer, a thermometer, a gas inlet tube and a gas outlet tube, 0.9 litre of benzene is introduced. Then 110 mmoles of butadiene 1-3 is added and ethylene and propylene are fed in in a molar ratio of 60 : 40; the feed of ethylene and propylene is kept up during the polymerization. After that, the benzene-dissolved catalyst components diethyl aluminium chloride, titanium tetrachloride and dibutyl magnesium are added in amounts of 6.0, 0.1 and 2.0 mmoles, respectively. The final volume is 1 litre. During the polymerization the temperature is maintained at 30°C; the polymerization pressure amounts to 0.7 atm. The polymerization is stopped after 2 hours, when 84 grammes of polymer is obtained. The polymer contains 26 percent by weight of propylene. The unsaturation is 0.13 mgeq/g of polymer. The intrinsic viscosity amounts to 3.3.

EXAMPLE 2

In a continuous experiment in which the same catalyst components are used in the same concentrations, heptane is applied as the distributing agent. The ethylene to propylene ratio is 30 : 70, the pressure 1 atm. The mean residence time is 30 min. Per litre of distributing agent 110 mmoles of butadiene is added. Per litre of polymerization medium an amount of 9.6 g of polymer is obtained, with 39 percent by weight of propylene and an unsaturation of 0.47 mgeq/g of polymer. The intrinsic viscosity is 1.7.

EXAMPLE 3

The process of example 2 is repeated, this time with a catalyst composed of 1 mmole/litre of aluminium diethyl chloride, 0.25 mmole/l of di-n.butyl magnesium and 0.025 mmoles/l of titanium tetrachloride. Instead of butadiene, 30 mmoles/l of dicyclopentadiene is fed in. Per litre of polymerization medium an amount of 27 g of polymer is obtained, which, besides ethylene, contains 49 percent by weight of propylene and 3.8 percent by weight of dicyclopentadiene. Application of diethyl magnesium instead of di-n.butyl magnesium gives about the same results.

EXAMPLE 4

When example 3 was repeated, with 20 mmoles/l of 5-ethylidene norbornene-2 instead of 30 mmoles/l of dicyclopentadiene, the yield was 30 g of polymer containing 0.7 percent by weight of 5-ethylidene norbornene. The magnesium compound used in this example contained more than two molecules of dibutyl ether per atom of magnesium.

EXAMPLE 5

A mixture of ethylene, propylene and 5-ethylidene norbornene-2 was continuously polymerized at a temperature of 25°C and a pressure of 1 atm. gauge.
  a. 200 ml of heptane in which 1 mmole of dibutyl magnesium and 40 mmoles of 5-ethylidene norbornene-2 had been dissolved;
  b. 900 ml of heptane in which the reaction product of 4 mmoles of diethylaluminium chloride and 1 mmole of decanol had been dissolved, and
  c. a solution of 0.1 mmole of TiCl$_4$ in 900 ml of heptane were hourly supplied to the reactor. Moreover, gaseous ethylene and gaseous propylene were fed into the reactor at a rate of 66 and 154 l/hour respectively. The average time of residence in the reactor amounted to 30 minutes.

The hourly terpolymer yield was 104 g.

EXAMPLE 6

A mixture of ethylene, propylene and dicyclopentadiene was continuously polymerized at a temperature of 25°C and a pressure of 1 atm. gauge.
  a. a solution of 0.5 mmole of dibutyl magnesium and 60 mmoles of dicyclopentadiene in 200 ml of heptane;
  b. 900 ml of heptane in which the reaction product of 2 mmoles of diethylaluminium chloride and 0.5 mmole of decanol had been dissolved, and
  c. a solution of 0.045 mmole of TiCl$_4$ in 900 ml of heptane were hourly supplied to the reactor. Moreover, ethylene and propylene were fed into the reactor at a rate of 55 and 130 l/hour, respectively.

The hourly terpolymer yield was 54 g.

We claim:

1. In a process for preparing a vulcanizable polymer of 20 – 75 percent by weight of ethylene, 24 – 79 percent by weight of propylene, and at least 0.5 percent by weight of at least one aliphatic or alicyclic poly-unsaturated compound, said polymer containing an amount of said poly-unsaturated compound to render said polymer sulphur-curable, wherein a mixture of these monomers is contacted in a liquid distributing agent with a catalyst prepared from an aluminum-halogen compound, a compound of a transition metal which is a halide, an alkoxide, or a chelate of a transition metal of Groups 4 – 6, and an organo-magnesium compound, the improvement comprising using, as said organo-magnesium compound, an organo-magnesium compound having at least one alkyl or cycloalkyl group attached thereto, and a second group which is selected from the group consisting of alkyl, cycloalkyl, alkoxy, halogen and hydroxy attached thereto, the molar ratio of aluminum-halogen:transition metal compound being about 2:1 to about 100:1, and the molar ratio of organo-magnesium compound: transition metal compound being about 0.1 to about 200 and the molar ratio of aluminum-halogen compound:organo-magnesium compound being about 0.25 to about 50.

2. The process as claimed in claim 1, wherein said magnesium derivative is dialkyl magnesium or dicycloalkyl magnesium.

3. The process as claimed in claim 2, wherein said magnesium derivative is diethyl magnesium.

4. The process as claimed in claim 2, wherein said magnesium derivative is dibutyl magnesium.

5. The process as claimed in claim 1, wherein the transition metal is a metal out of the groups 4 – 6 inclusive of the Mendeleef Periodic System.

6. The process as claimed in claim 5, wherein said compound of a transition metal is a titanium halogenide or a vanadium halogenide or oxyhalogenide.

7. The process as claimed in claim 1, wherein said process is conducted at a temperature between −40° and +80°C.

8. The process as claimed in claim 1, including the additional step of curing said polymer by heating said polymer in the presence of sulphur at a temperature of 100°–250°C.

9. The process as claimed in claim 8 wherein said polymer is heated at a temperature of 140° – 170°C.

10. The process as claimed in claim 1, wherein the compound of a transition metal is a halide of a transition metal of Groups 4 – 6.

* * * * *

UNITED STATES PATENT OFFICE
CERTIFICATE OF CORRECTION

Patent No. 3,880,817          Dated April 29, 1975

Inventor(s) Cornelis E.P.V. van den Berg et al

It is certified that error appears in the above-identified patent and that said Letters Patent are hereby corrected as shown below:

In item [30],

Foreign Application Priority Data should read:

--May 15, 1968     Netherlands     68 06893--

Signed and Sealed this

Third Day of October 1978

[SEAL]

Attest:

RUTH C. MASON
Attesting Officer

DONALD W. BANNER
Commissioner of Patents and Trademarks